(12) United States Patent
Usui

(10) Patent No.: US 8,230,133 B2
(45) Date of Patent: Jul. 24, 2012

(54) MICROCOMPUTER WITH INTERNAL DMA

(75) Inventor: Minoru Usui, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 391 days.

(21) Appl. No.: 11/036,332

(22) Filed: Jan. 18, 2005

(65) Prior Publication Data

US 2005/0216612 A1    Sep. 29, 2005

(30) Foreign Application Priority Data

Mar. 29, 2004 (JP) .................................. 2004-95714

(51) Int. Cl.
*G06F 13/28* (2006.01)
(52) U.S. Cl. .......................................... 710/22; 710/26
(58) Field of Classification Search ................ 710/22, 710/26
See application file for complete search history.

(56) References Cited

U.S. PATENT DOCUMENTS

| | | | | |
|---|---|---|---|---|
| 5,333,274 | A | * | 7/1994 | Amini et al. ................ 714/50 |
| 5,884,075 | A | * | 3/1999 | Hester et al. ............... 713/100 |
| 6,542,491 | B1 | * | 4/2003 | Tari et al. .................. 370/338 |
| 6,665,759 | B2 | * | 12/2003 | Dawkins et al. ........... 710/200 |

FOREIGN PATENT DOCUMENTS

| | | |
|---|---|---|
| JP | 4-182852 | 6/1992 |
| JP | 5-53968 | 3/1993 |
| JP | 05053968 A * | 3/1993 |

OTHER PUBLICATIONS

Communication mailed from the Japanese Patent Office on Jan. 5, 2010 in the related Japanese patent application No. 2004-095714.

* cited by examiner

*Primary Examiner* — Henry Tsai
*Assistant Examiner* — John Roche
(74) *Attorney, Agent, or Firm* — Staas & Halsey LLP

(57) ABSTRACT

A microcomputer has: a CPU; memory; a direct memory access controller which controls access to the above memory without passing through the CPU; a plurality of peripheral resources, each having prescribed functions corresponding to a given real resource number, and issuing an access request to the direct memory access controller to perform data transfer with the memory; and, a resource conversion unit, which performs signal conversion between the direct memory access controller and the plurality of peripheral resources. A portion of the peripheral resources among the plurality of peripheral resources are associated with logical resource numbers of the direct memory access controller by the resource conversion unit.

12 Claims, 12 Drawing Sheets

FIG. 3
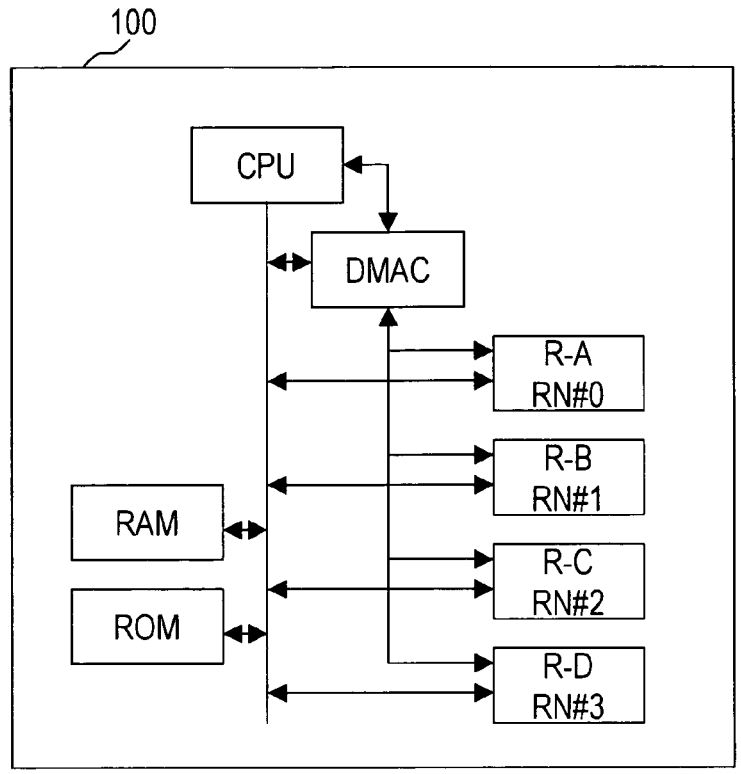
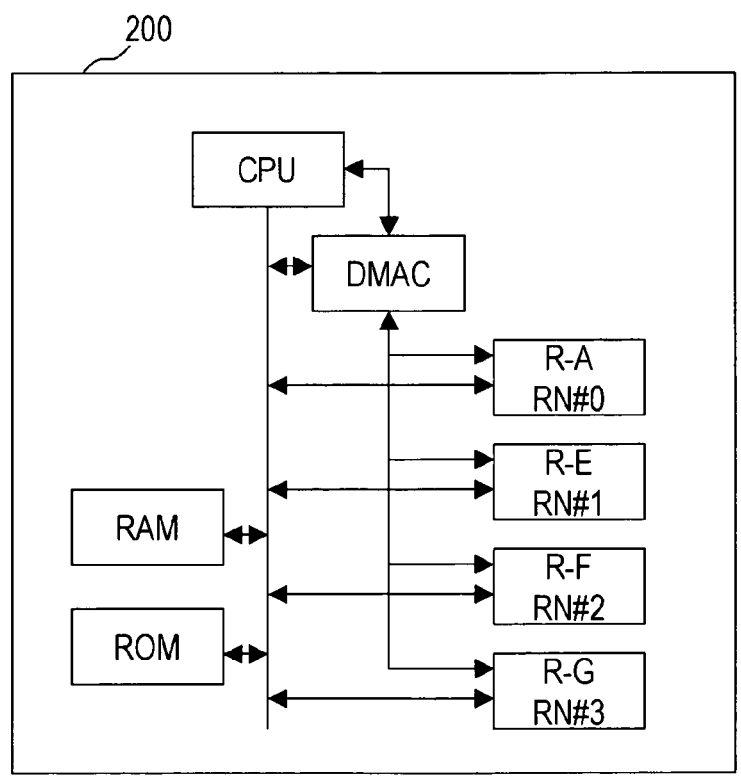

FIG. 4
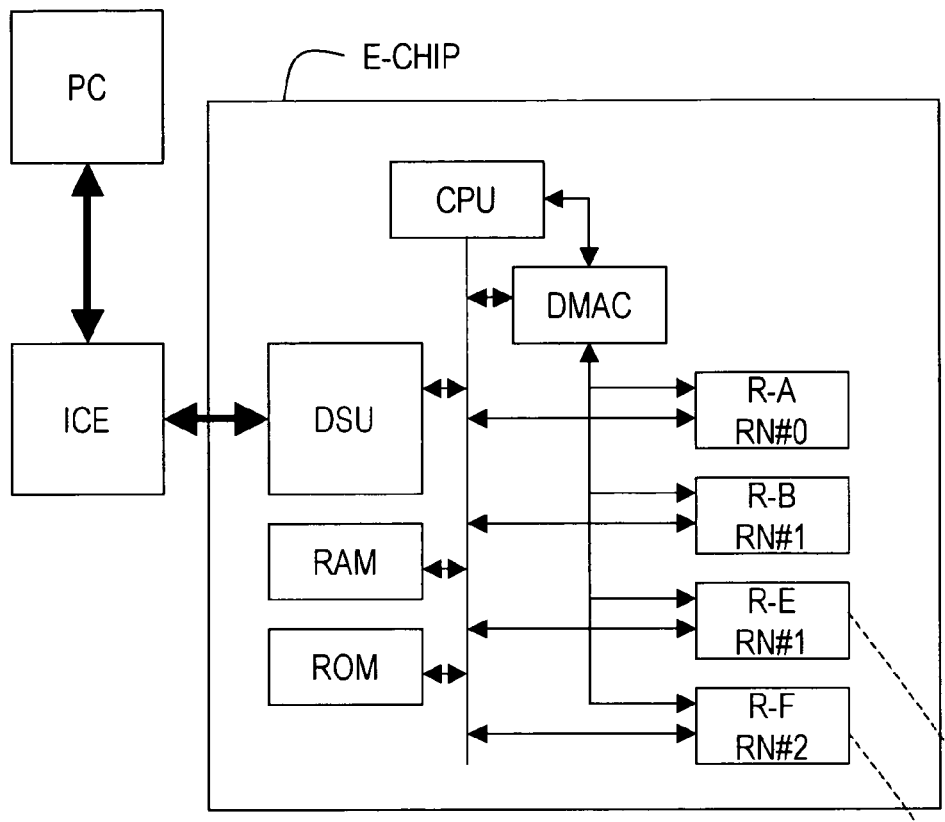
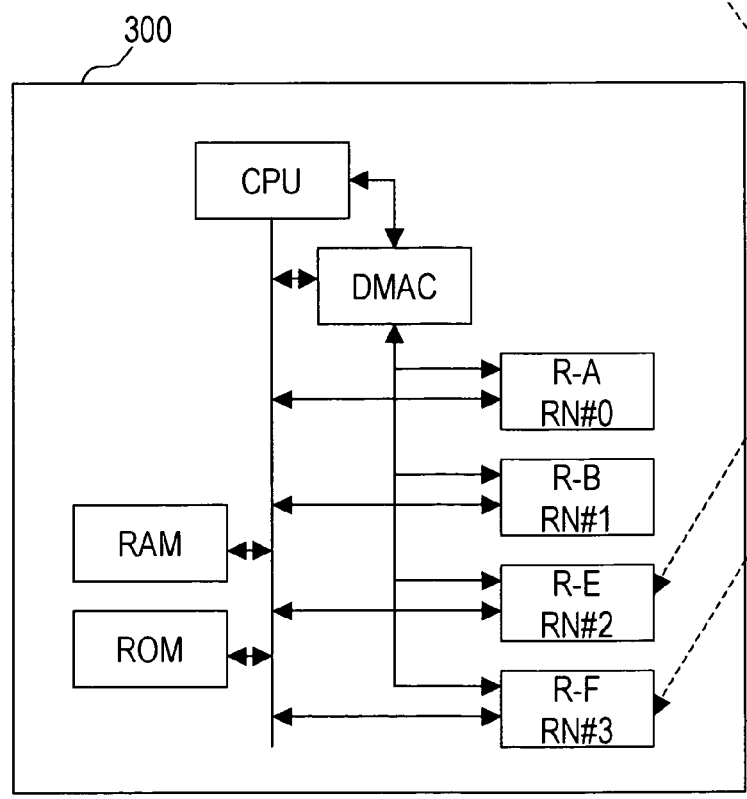

FIG. 10    DMA CONTROL OPERATION

MICROCOMPUTER WITH INTERNAL DMA

CROSS-REFERENCE TO RELATED APPLICATIONS

This application is based upon and claims the benefit of priority from the prior Japanese Patent Application No. 2004-95714, filed on Mar. 29, 2004, the entire contents of which are incorporated herein by reference.

BACKGROUND OF THE INVENTION

1. Field of the Invention

This invention relates to a microcomputer with internal DMA (Direct Memory Access), and in particular to a microcomputer for evaluation, equipped with numerous peripheral resources, and capable of use in common with a plurality of types of microcomputer.

2. Description of the Related Art

A microcomputer has, for example, a CPU, memory such as RAM and ROM, and peripheral resources with various functions, connected via a bus. Peripheral resources have various functions required for control by the microcomputer, such as timer, communication macro, and other functions, and are a type of macro circuit. As memory access control in a microcomputer, in addition to CPU access controlled by the CPU, there is also access controlled by a DMA controller which enables access of memory by peripheral resources, without passing through the CPU. A microcomputer enabling such DMA is for example described in Japanese Patent Laid-open No. 5-53968.

In this Japanese Patent Laid-open Publication No. 5-53968 (laid open Mar. 5, 1993), the automatic assignment of DMA channels to all peripheral device boards, without exception, is described. In this way, in DMA control, unique channel numbers are assigned to all peripheral resources using DMA, and control of DMA access to memory is performed based on these channel numbers. For example, when power is turned on, transfer source addresses and transfer target addresses are registered in the DMA controller for all channels, and in response to DMA requests from peripheral resources the DMA controller references the registered transfer source addresses and transfer target addresses and performs the necessary data transfer control. After the completion of data transfer, the DMA controller transmits a signal to clear the request to the peripheral resource, and causes the peripheral resource issuing the DMA request to withdraw the DMA request. Thus in order to execute DMA control, unique channel numbers must be assigned to peripheral resources requesting DMA access.

In the microcomputer development stage, a microcomputer for evaluation purposes is developed in which a debug support unit is installed, enabling the referencing of data in internal memory from an external device, or the halting and resumption program execution with arbitrary timing. A microcomputer for evaluation is connected to a device to be controlled, the program under development is executed, and the microcomputer for evaluation is used to perform evaluations to determine whether the desired control is being executed, as well as for debugging of the program being developed.

On the other hand, different or identical peripheral resources are often installed on numerous microcomputers possessed by a customer, and the macro data of the numerous peripheral resources developed in the past constitute an important asset for the customer. As explained above, in a microcomputer having DMA functions, unique channel numbers are assigned to the installed peripheral resources. Consequently each peripheral resource has a resource number corresponding to the assigned channel number, and is designed to execute prescribed operations corresponding to this resource number. For example, when some control signal with a resource number is applied by the DMA controller, a peripheral resource references the applied resource number and recognizes that the control signal is addressed to itself, and executes the corresponding control operation. In this way, normally the numerous peripheral resources developed in the past each incorporate a function corresponding to the resource number assigned in the corresponding microcomputer on which the resource is installed.

Hence when arbitrarily combining developed peripheral resources to develop a new microcomputer, if it were possible to install the developed peripheral resource macros in a microcomputer chip for evaluation, debugging tasks and control evaluation in the initial period of the development stage could be begun earlier. However, in actuality resource numbers are assigned corresponding to channel numbers in each developed microcomputer differently. Consequently if the developed peripheral resource macro is installed in the evaluation chip without modification, cases will arise in which the DMA channel numbers do not correspond to the resource numbers of developed peripheral resources. Or, if the developed peripheral resource macro is installed without modification on an evaluation chip, resource numbers of the installed peripheral resources may be repeated, so that correct DMA control becomes impossible.

Due to such circumstances, conventionally when a new microcomputer is being developed, even if a peripheral resource developed in the past is to be used, it has been necessary to develop a new peripheral resource corresponding to a DMA channel of the new microcomputer or to obtain the new peripheral resource by altering the developed peripheral resource, so as to newly develop a microcomputer chip for evaluation incorporating the peripheral resource. This new development of a chip for evaluation increases the cost of development of the microcomputer, and leads to reduced throughput of the development process.

SUMMARY OF THE INVENTION

An object of this invention is to provide a microcomputer for evaluation which can be used in common for the development of different microcomputers.

In order to attain the above object, a first aspect of the invention is a microcomputer having: a CPU; memory; a direct memory access controller which controls access to the above memory without passing through the CPU; a plurality of peripheral resources, each having prescribed functions corresponding to a given real resource number, and issuing an access request to the direct memory access controller to perform data transfer with the memory; and, a resource conversion unit, which performs signal conversion between the direct memory access controller and the plurality of peripheral resources. A portion of the peripheral resources among the plurality of peripheral resources are associated with logical resource numbers of the direct memory access controller by the resource conversion unit. Here, a logical resource number is a number associated with a DMA channel as described above, and does not necessarily correspond to the real resource numbers of the installed plurality of peripheral resources.

In order to attain the above object, a second aspect of the invention is a microcomputer having: a CPU; memory; a direct memory access controller which controls access to the memory without passing through the CPU; a plurality of peripheral resources, each having prescribed functions corresponding to a given real resource number, transmitting an access request signal to the direct memory access controller to perform data transfer with the memory, and canceling the access request signal in response to a clear request signal supplied by the direct memory access controller; and, a resource conversion unit, having a first correspondence table which associates a portion of the peripheral resources among the plurality of peripheral resources and logical resource numbers of the direct memory access controller, and converting the access request signal and clear request signal between the direct memory access controller and the plurality of peripheral resources, based on the first correspondence table. The first correspondence table can be overwritten by an external device.

By means of this invention, a plurality of peripheral resources can be installed, and only a portion of peripheral resources among the installed plurality of peripheral resources can be associated with logical resource numbers of the direct memory access controller, so that a microcomputer for evaluation can be used in common in different development tasks.

BRIEF DESCRIPTION OF THE DRAWINGS

FIG. 3 shows examples of the configurations of a plurality of microcomputers;

FIG. 4 shows an example of a newly developed microcomputer;

DESCRIPTION OF THE PREFERRED EMBODIMENTS

Below, preferred embodiments of the invention are explained, following the drawings. However, the technical scope of the invention is not limited to these embodiments, but extends to the inventions described in the scope of claims and inventions equivalent thereto.

Figure 1:
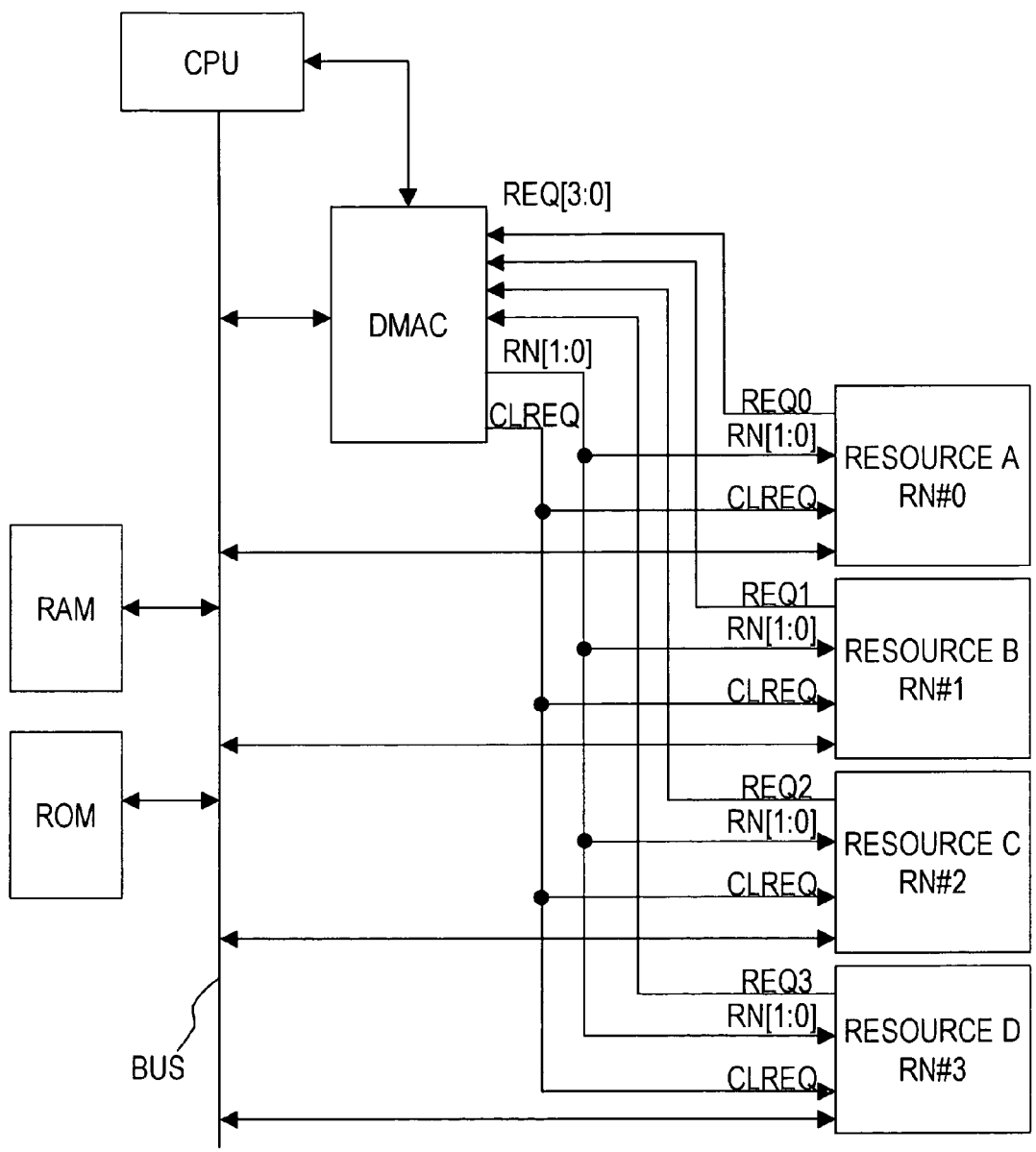
FIG. 1 is an example of the configuration of a microcomputer for mass production.

FIG. 1 is an example of the configuration of a microcomputer for mass production. This microcomputer has a CPU, memory such as RAM and ROM, peripheral resources A, B, C and D, and a DMA controller DMAC, connected via an internal bus BUS. The CPU controls access to memory in addition to executing programs and managing the bus. The peripheral resources have various functions such as timer, communication macro, and DA (Digital to Analog) conversion circuit, and are connected to the bus BUS. The DMA controller DMAC executes DMA control for memory access by the peripheral resources. The DMA controller DMAC has for example four DMA channels; to these DMA channels are assigned the resource numbers RN#0 to RN#3 of the peripheral resources A, B, C, D.

Figure 2:
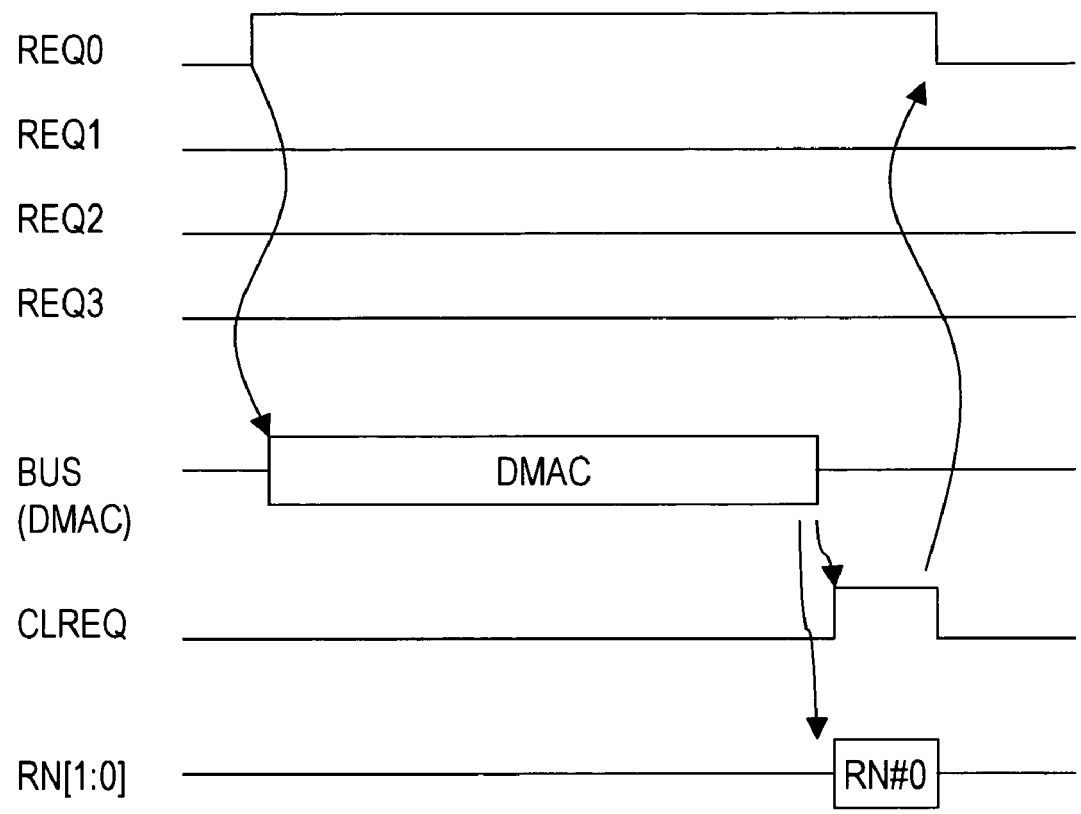
FIG. 2 is a timing chart showing DMA control operation.

FIG. 2 is a timing chart showing DMA control operation. DMA control operation is explained using FIG. 1 and FIG. 2. Each resource asserts a DMA request signal REQ0 to REQ3 to the DMA controller, and requests DMA control by the DMA controller. In the example of FIG. 2, the resource A sets the DMA request signal REQ0 to H level to assert the DMA request signal, requesting DMA control. In response, the DMA controller DMAC performs arbitration control for bus rights with the CPU, and when bus rights are obtained, controls data transfer between resource A and RAM or ROM according to the transfer source address and transfer target address set in advance. For example, suppose data stored in a buffer in resource A is to be written to a transfer target address in RAM. The DMA control procedure is set in advance for each resource and is written in a register (not shown) in the DMA controller.

When the DMA controller DMAC ends the requested DMA control operation, it sets the clear request signal CLREQ to H level to request that the resource A cancel the DMA request, and outputs the resource number RN#0 of the resource A to the resource number bus RN[1:0]. The clear request signal CLREQ is supplied in common to all resources; each resource checks whether the resource number of the resource number bus RN[1:0] coincides with its own resource number. Resource A, for which there is coincidence, thus lowers the DMA request signal REQ0 to L level to cancel the request. In this way, the resource number bus is a type of address bus, and the resource number is a type of source address.

The DMA control shown in FIG. 1 and FIG. 2 is one example; other methods can be used to realize DMA requests from resources and clear requests. However, in the example of FIG. 1 and FIG. 2, each resource asserts a dedicated DMA request signal to the DMA controller to avoid DMA request contention. On the other hand, there is no possibility of content among clear requests, and therefore the number of signal lines is reduced to only single line. And the DMA controller outputs the clear request signal and a resource number to a resource number bus RN[1:0] which is common to all resources. In particular, when there are eight DMA channels, clear request signals can be transmitted to resources specified by a three-bit resource number bus RN[2:0], for a significant reduction in the number of signal lines.

Thus a resource number is assigned corresponding to each DMA channel, and circuits within resources are configured so as to perform their functions corresponding to the resource numbers. That is, the resource circuitry is configured such that when the assigned resource number and a supplied resource number coincide, its function is executed.

FIG. 3 shows examples of the configurations of a plurality of microcomputers. In FIG. 3, two types of microcomputer, 100 and 200, are shown. Microcomputer 100 has four resources R-A, R-B, R-C, R-D, and to each resource is assigned a resource number RN#0 to RN#3. On the other hand, microcomputer 200 also has four resources R-A, R-E, R-F, R-G, to each of which is assigned a resource number RN#0 to RN#3. That is, the two microcomputers 100 and 200 have the same resource R-A, but the remaining three resources are different. However, since the number of DMA channels is limited to four in each microcomputer, the resource numbers RN#0 to RN#3 are assigned to the resources in both microcomputers 100, 200. That is, the same resource number RN#1 is assigned to the different resources R-B and R-E, and similarly, resource number RN#2 is assigned to resources R-C and R-F, and resource number RN#3 is assigned to resources R-D and R-G.

In this way, in the stage of microcomputer development the resources necessary for the microcomputer are also developed. Thus macro data for resources already developed is accumulated as a kind of design asset. And, the need frequently arises to develop a new microcomputer using such macro data developed in the past.

FIG. 4 shows an example of a newly developed microcomputer. Here a microcomputer in which the developed resources R-A, R-B, R-E, R-F are installed is assumed. In the microcomputer development stage, an evaluation chip E-CHIP provided with a debug support unit DSU is made, this evaluation chip is connected to a device to be controlled and control operations are executed, and evaluations are performed for program debugging. The DSU is connected to a personal computer PC via an in-circuit emulator ICE, and is used for evaluation and control such as halting and resuming program execution at an arbitrary step and monitoring specified data in the internal memory RAM.

Four developed resources are installed without modification in the evaluation chip E-CHIP in FIG. 4; resource numbers RN#0, RN#1, RN#1, RN#2, provided to the respective resources R-A, R-B, R-E, R-F at the time of development, are assigned. Hence these resource numbers do not correspond to the channel numbers of the DMA controller, and so in this state DMA control is not possible. Hence the macros of the developed resources cannot be used without modification, and so despite the desirability of providing an evaluation chip with as short a turnaround time as possible, there is the drawback that the development cycle for an evaluation chip is lengthened.

On the other hand, in a microcomputer for mass production 300 four resources, to which are assigned the resource numbers RN#0 to RN#3 corresponding to DMA channels, are developed and installed. These resources are developed into circuits corresponding to new resource numbers through partial modification of developed macros. However, a microcomputer for mass production is provided after an evaluation process using a microcomputer for evaluation, and so the need for such re-development of resources does not constitute such a major problem.

When a newly developed microcomputer has a different combination of resources from those in FIG. 4, a corresponding evaluation chip must also be developed. The development each time of an evaluation chip which is not to be mass produced results in increased development costs and so is undesirable. Hence if it were possible to provide an evaluation chip which can utilize the asset of resources installed in developed microcomputers as they are, an evaluation chip could be provided quickly, and development costs could be suppressed.

Figure 5:
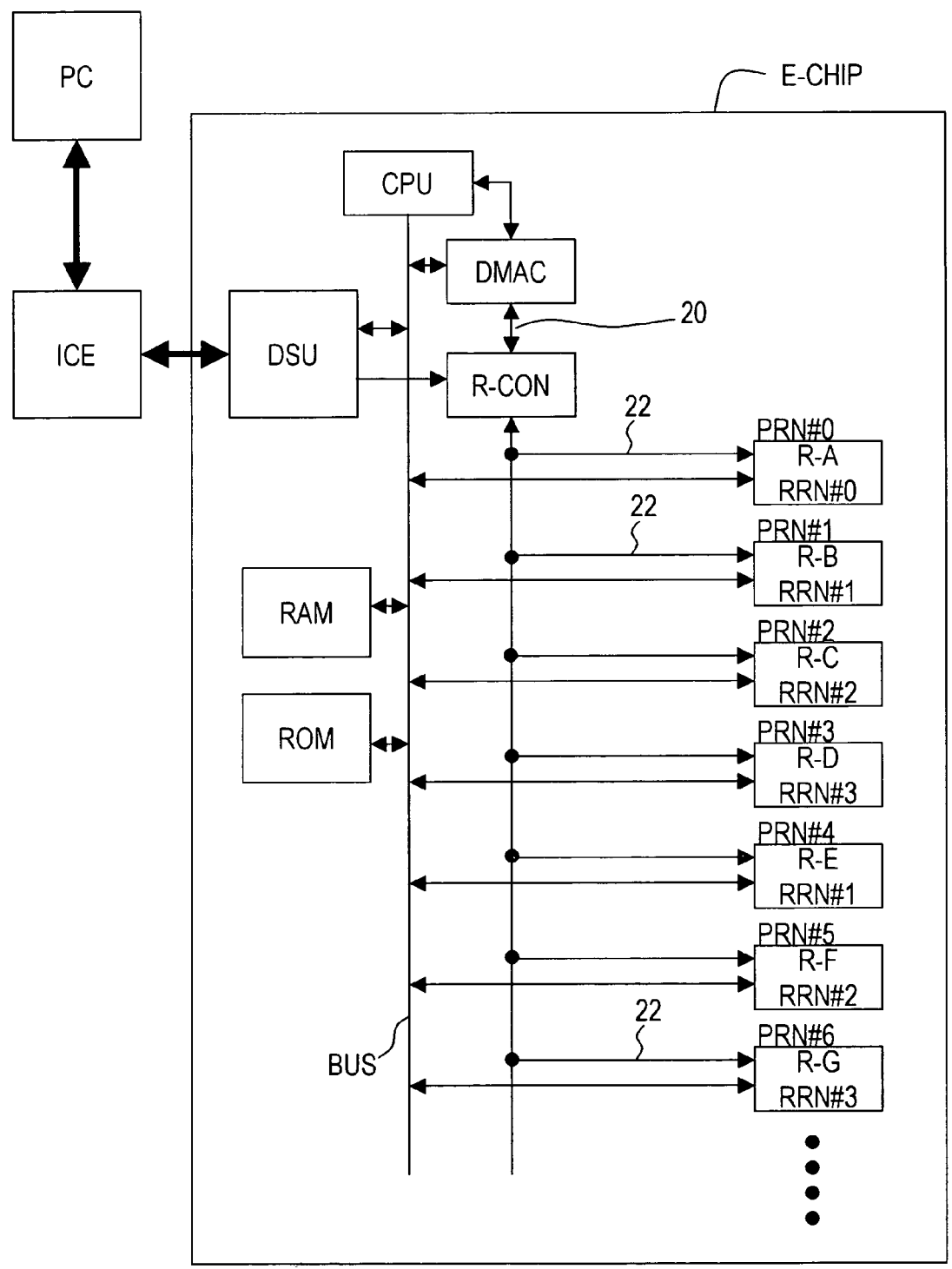
FIG. 5 shows the configuration of a microcomputer for evaluation of one embodiment.

FIG. 5 shows the configuration of an evaluation microcomputer of the embodiment. This evaluation microcomputer E-CHIP has, in addition to a CPU, RAM, ROM, and DMAC all connected via a bus BUS, numerous developed resources. For example, an evaluation chip for a particular client may have installed all or a portion of the resources developed by the client. The evaluation chip can then be used in common for all development of new microcomputers for that client. In the example of FIG. 5, the seven resources R-A, R-B, R-C, R-D, R-E, R-F, and R-G which are installed on the two microcomputers 100, 200 shown in FIG. 3 are installed. Hence the real resource numbers RRN#0, RRN#1, RRN#2, RRN#3, RRN#1, RRN#2, and RRN#3 assigned to the resources at the time of development are assigned without modification. As a result, some real resource numbers may be repeated.

In this aspect, resource numbers actually assigned to developed resources are called real resource numbers RRN#. On the other hand, physical resource numbers PRN#0 to PRN#6 are assigned to these resources as unique addresses for identification of the plurality of installed resources. In this aspect, up to a maximum 16 resources can be installed, and so the physical resource numbers are PRN#0 to PRN#15. Further, the channel numbers of the DMA controller DMAC are IDs used to logically identify resources, and so in this embodiment are called logical resource numbers.

A resource conversion unit R-CON is provided to perform signal conversion between the DMA controller DMAC and the plurality of resources; in this resource conversion unit R-CON, a portion of the peripheral resources which are to be utilized among the plurality of resources are associated with logical resource numbers of the DMA controller DMAC. The resource conversion unit R-CON converts signals 20 of the DMA controller DMAC into signals 22 to resources for use, and conversely converts signals 22 from resources for use into signals 20 for the DMA controller. This conversion control is necessary because only a portion of the installed resources are assigned for control by the DMA controller, and is also necessary because there may be repetition of real resource numbers RRN# among the installed resources. Hence, in more specific terms, the resource conversion unit R-CON has a correspondence table indicating the correspondence between logical resource numbers of the DMA controller and physical resource numbers PRN# of resources to be used, as well as a correspondence table indicating the correspondence between logical resource numbers of the DMA controller and real resource numbers RRN# of resources to be used. Conversion control between the signals 20 and 22 is performed using these correspondence tables.

Given the evaluation chip E-CHIP shown in FIG. 5, a new microcomputer evaluation chip which arbitrarily combines developed resources can be easily configured. As explained above, correspondence tables is only necessary to be provided in the resource conversion unit R-CON according to the resources to be used, and the settings can be made from an external device via the DSU. That is, the evaluation microcomputer can be used in common to development projects as a new microcomputer evaluation chip, so long as only developed resources are combined and used, so that development costs can be reduced and the development process for the evaluation chip can be shortened.

Figure 6:
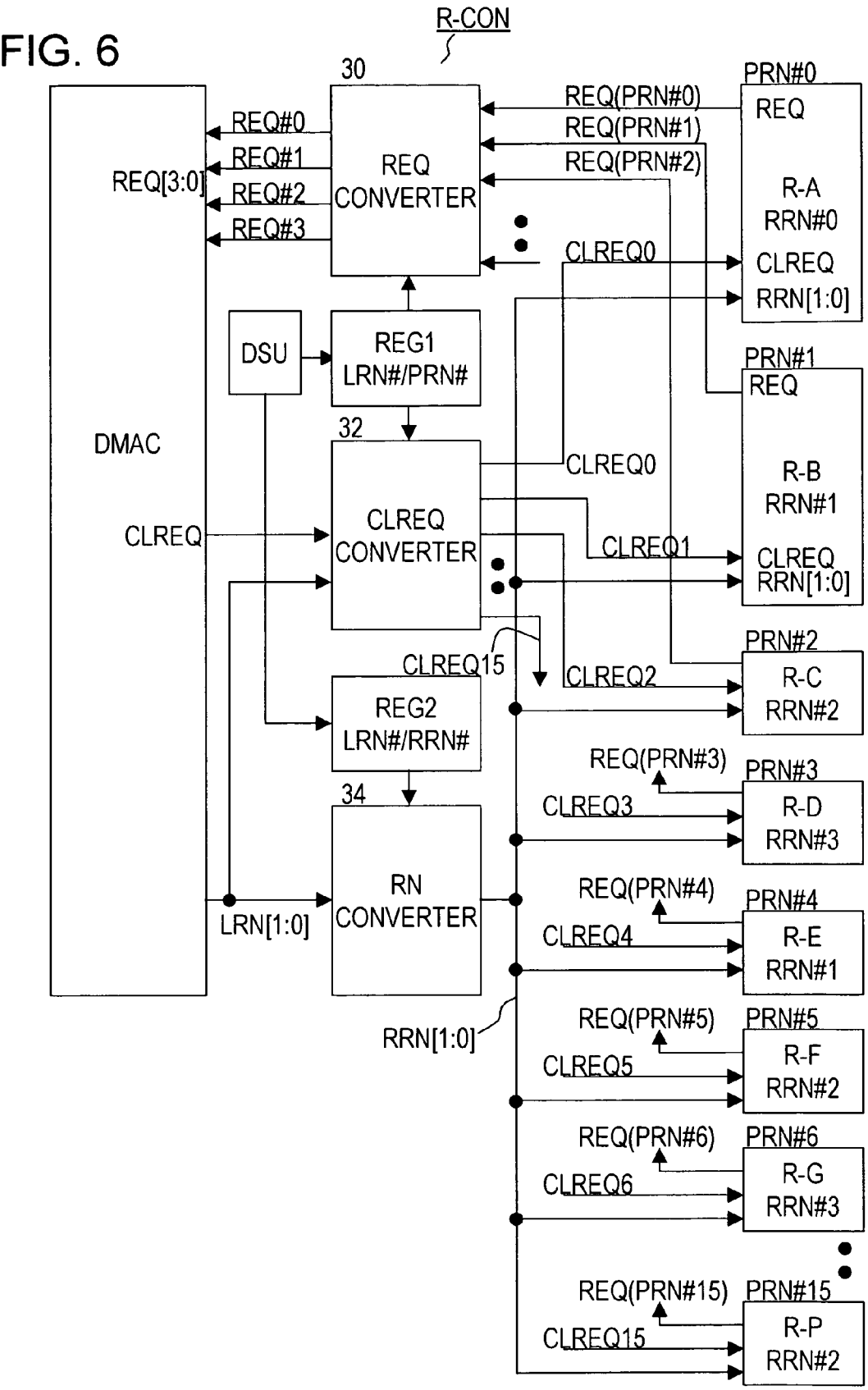
FIG. 6 shows the configuration of the resource conversion unit of the microcomputer for evaluation of the embodiment.

FIG. 6 shows the configuration of the resource conversion unit of the evaluation microcomputer of this embodiment. The resource conversion unit R-CON is provided between the DMA controller DMAC and the 16 resources R-A, R-B, . . . , R-G, . . . , R-P. In this example, four DMA channels can be used, and two-bit logical resource numbers LRN[1:0] are provided in the DMA controller corresponding to these four DMA channels. On the other hand, the 16 resources are provided with unique physical resource numbers PRN#0 to PRN#15. The resource conversion unit R-CON has a first register REG1 in which is stored a first correspondence table indicating the correspondence between the logical resource numbers LRN# of the DMA controller and the physical resource numbers PRN# of the resources for use, as well as a second register REG2 in which is stored a second correspondence table indicating the correspondence between the logical resource numbers LRN# of the DMA controller and the real resource numbers RRN# of the resources for use.

DMA request signals REQ are output from each of the 16 resources. Hence 16 DMA request signals REQ are provided, corresponding to 16 physical resource numbers PRN#. On the other hand, the DMA controller DMAC can only receive four channels' worth of DMA request signals, REQ#0 through REQ#3. Hence the request conversion unit R-CON has a request conversion portion 30 which, based on the first correspondence table REG1, converts a DMA request signal supplied from a portion of the peripheral resources for use into a DMA request signal REQ#0 to REQ#3 corresponding to DMAC logical resource numbers. The converted access request signals REQ#0 to REQ#3 are supplied to the DMA controller DMAC. This first correspondence table REG1 and the configuration of the request conversion portion 30 are described in detail below.

Then, when a clear request signal CLREQ output by the DMA controller DMAC with real resource number is given to all resources in common as an ordinary microcomputer, because there exists a resource having the same real resource number, a clear request may also be asserted to a resource not corresponding to the DMA channel. Hence in response to the clear request signal CLREQ, the clear request conversion portion 32 generates a clear request signal CLREQ0 to CLREQ15 for the resource corresponding to the DMA channel. That is, when a clear request signal CLREQ is supplied by the DMAC, the clear request conversion portion 32 sets the clear request signal only for the resource specified by the logical resource number LRN[1:0] among the 16 clear request signals CLREQ0 to CLREQ15 to H level, and supplies this to the resource. In order to perform this conversion operation, the clear request conversion portion 32 references the first table REG1. By this means, a clear request signal is supplied only for the logical resource specified by the DMAC. The structure of the clear request conversion portion 32 is described in detail below.

Because the logical resource numbers LRN[1:0] corresponding to DMAC channels and the real resource numbers RRN[1:0] of resources for use are in a one-to-one correspondence, the resource conversion unit R-CON has a second register REG2 in which is stored a second correspondence table of these resource numbers, and a resource number conversion portion 34 which converts logical resource numbers LRN[1:0] into real resource numbers RRN[1:0]. The resource number conversion portion 34 outputs the converted real resource number RRN[1:0] to the real resource number bus RRN[1:0], to supply to all resources. The structure of the resource number conversion portion 34 is described in detail below.

A case is here explained in which the evaluation chip E-CHIP shown in FIG. 4 is realized using the evaluation chip of FIG. 5 and FIG. 6. That is, among the 16 resources of FIG. 5 and FIG. 6, the resources R-A, R-B, R-E, R-F are resources to be used, and logical resource numbers LRN[1:0] #0, #1, #2, #3, which are DMA channels, are assigned to these four resources. That is, the correspondence between logical resource numbers LRN[1:0] and physical resource numbers PRN[3:0], and the correspondence between logical resource numbers LRN[1:0] and real resource numbers RRN#, are as follows.

| | | |
|---|---|---|
| LRN#0: | PRN#0: | RRN#0 |
| LRN#1: | PRN#1: | RRN#1 |
| LRN#2: | PRN#4: | RRN#1 |
| LRN#3: | PRN#5: | RRN#2 |

These correspondences are stored as the first and second correspondence tables in the registers REG1 and REG2.

Figure 7:
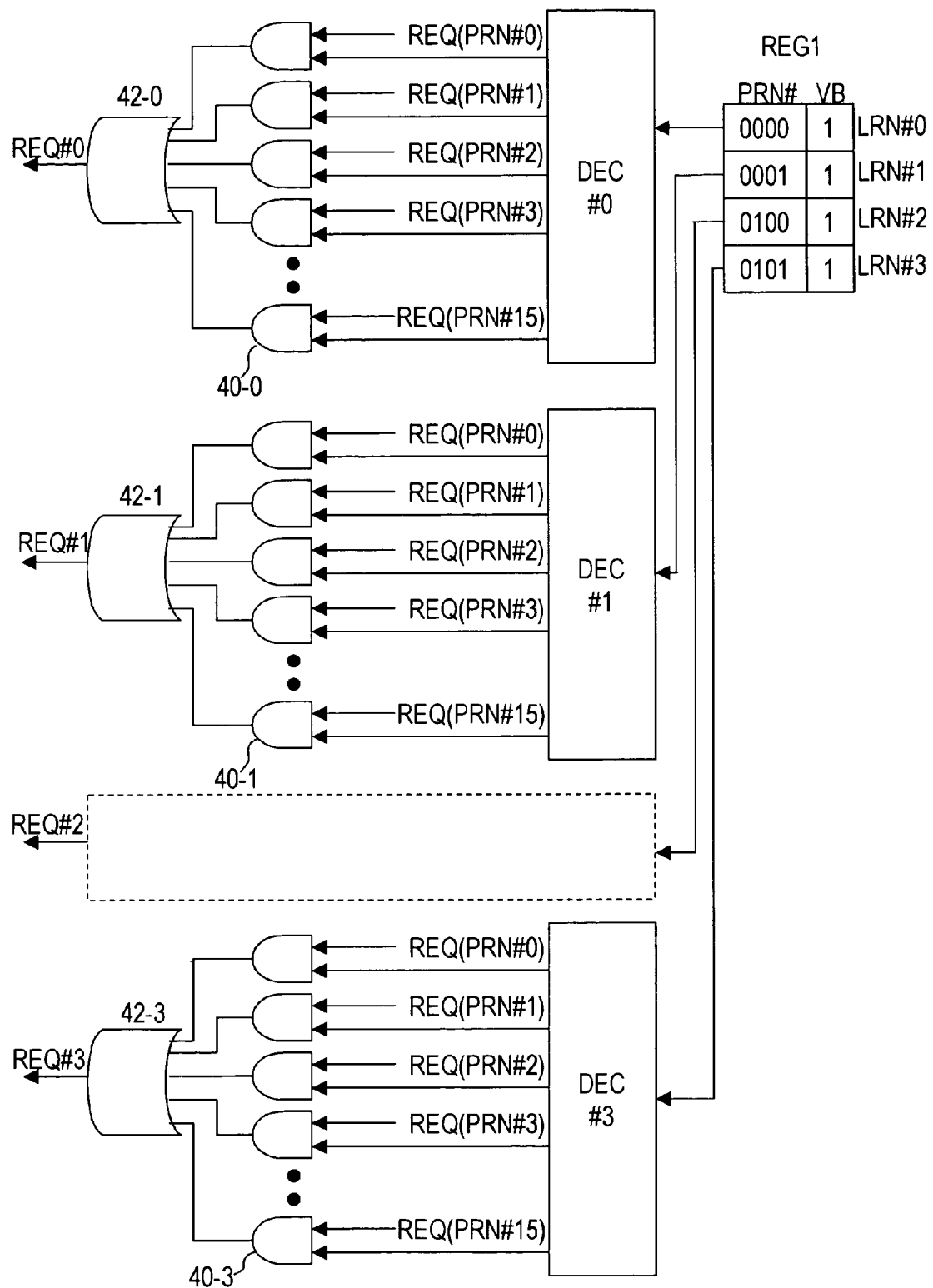
FIG. 7 shows the configuration of the request conversion portion 30.

FIG. 7 shows the configuration of the request conversion portion 30. Physical resource numbers PRN# for resources to be used are stored in the register areas of the first register REG1 corresponding to the logical resource numbers LRN#0 to LRN#3. Similarly to the above correspondence, the physical resource numbers PRN#0, #1, #4, #5 are stored, as four-bit data, in the first register REG1. There is also a validity bit VB indicating whether a resource is to be used; in this example, physical resource numbers are associated with all four logical resource numbers LRN, so that the validity bits VB are all set to "1".

The request conversion portion 32 has four conversion units to perform conversion of the 16 DMA request signals REQ(PRN#0) to REQ(PRN#15) from the respective 16 resources into four DMA request signals REQ#0 to REQ#3. Each unit has a decoder DEC#0 to DEC#3 which decodes the physical resource numbers PRN# of the first correspondence table REG1; these decoders set only the single decoded output signal to H level. The 16 AND gates 40-0 through 40-3, and the OR gates 42-0 through 42-3, output the DMA request signals REQ(PRN#0), REQ(PRN#1), REQ(PRN#4), and REQ(PRN#5), selected by the output signal of the decoders, as the request signals REQ#0 through REQ#3.

Figure 8:
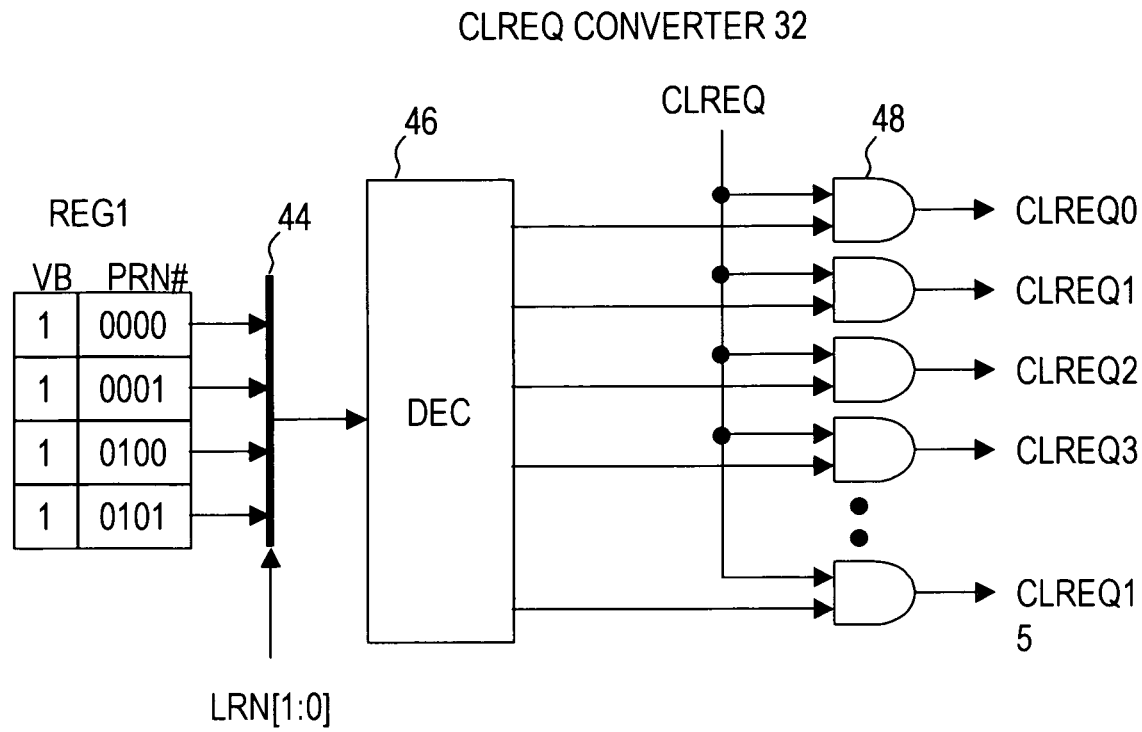
FIG. 8 shows the configuration of the clear request conversion portion 32.

FIG. 8 shows the configuration of the clear request conversion portion 32. The clear request conversion portion 32 comprises a selector 44 which selects a physical resource number PRN# within the first register REG1 according to a logical resource number LRN[1:0]; a decoder 46 which decodes the selected physical resource number PRN#; and an AND gate group 48 which converts the clear request signal CLREQ into one among 16 clear request signals CLREQ0 to 15, according to the 16 decoder outputs. By means of the clear request conversion portion 32, when the DMA controller DMAC outputs a clear request signal CLREQ, a clear request signal CLREQ0 to 15 corresponding to the resource specified by the logical resource number LRN is output.

Figure 9:
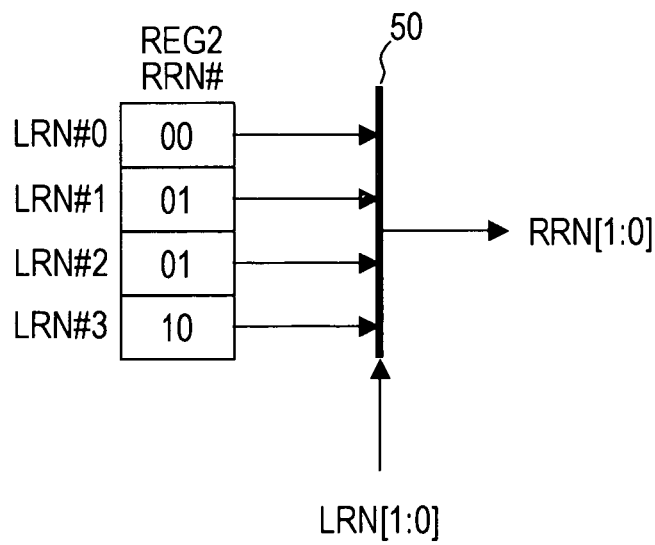
FIG. 9 shows the structure of the resource number conversion portion 34.

FIG. 9 shows the structure of the resource number conversion portion 34. The resource number conversion portion 34 comprises a selector 50 which selects the real resource number RRN[1:0] corresponding to the logical resource number LRN[1:0], according to the second correspondence table REG2 which stores two-bit real resource numbers RRN# corresponding to logical resource numbers LRN#0 to LRN#3. By this means, a logical resource number LRN[1:0] output by the DMA controller DMAC is converted into the real resource number RRN[1:0] of a resource to be used.

Figure 10:
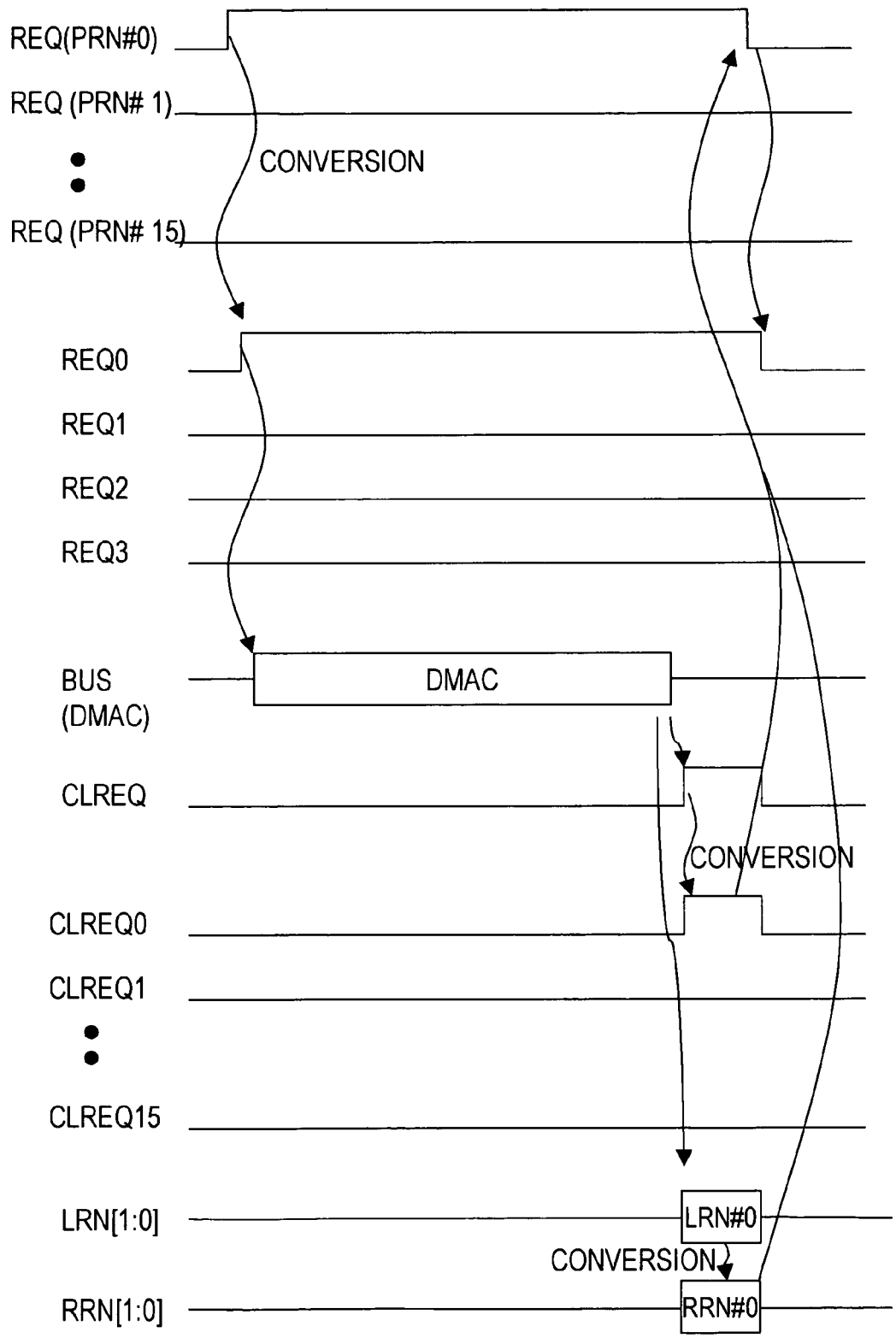
FIG. 10 is a timing chart of DMA control operation in the microcomputer for evaluation of the embodiment.

FIG. 10 is a timing chart of DMA control operation in the microcomputer for evaluation of this embodiment. DMA control operation is explained referring to FIG. 6 through FIG. 9. First, the physical resource number PRN# and real resource number RRN# corresponding to the logical resource number LRN# are respectively set in the first register REG1 and second register REG2 via the DSU. By this means, resources to be used are registered. Next, of the four resources to be used, when one resource R-A asserts the DMA request signal REQ(PRN#0) to H level, the output of the decoder DEC#0 within the request conversion portion 32 causes the request signal REQ#0 to the DMAC to be sent to H level. In respect to this request signal REQ#0, the DMAC executes prescribed DMA control.

Upon completion of the DMA control DMAC, the DMAC asserts the clear request signal CLREQ to H level, with outputting the logical resource number LRN#0 for the resource. This logical resource number LRN#0 is converted into the real resource number RRN#0 by the resource number conversion portion 34, and is output to all resources. The clear resource signal CLREQ is converted by the clear request conversion portion 32 into the clear request signal CLREQ0 for the physical resource number PRN#0 corresponding to the logical resource number LRN#0, and is supplied to resource R-A.

In response to the clear request signal CLREQ0, the resource R-A lowers the request signal REQ(PRN#0) to L level and cancels the DMA request. The change in this request signal REQ(PRN#0) is converted into a clear request signal REQ#0 by the request conversion portion 32.

The above-described DMA control operation is similar when the resources R-B, R-E, and R-F assert a DMA request. In particular, the resources R-B and R-E have the same real resource number, but the logical resource number LRN# is converted into the correct real resource number RRN# by the resource number conversion portion 32, and the clear request signal CLREQ# is asserted only for the resource specified by the clear request conversion portion 32 through the logical resource number LRN#, so that the appropriate DMA request signal can be removed. When the resource R-F asserts a DMA request also, conversion into the correct real resource number is performed by the resource number conversion portion 32, so that the appropriate action is possible.

When in DMA control operation the four resources simultaneously assert DMA requests, the DMAC executes DMA control in order, and each time a DMA control operation is completed, requests removal of the DMA request by the corresponding resource through a clear request signal CLREQ and logical resource number LRN#. By this means, even when there is DMA request contention, appropriate DMA control operation can be executed.

Figure 11:
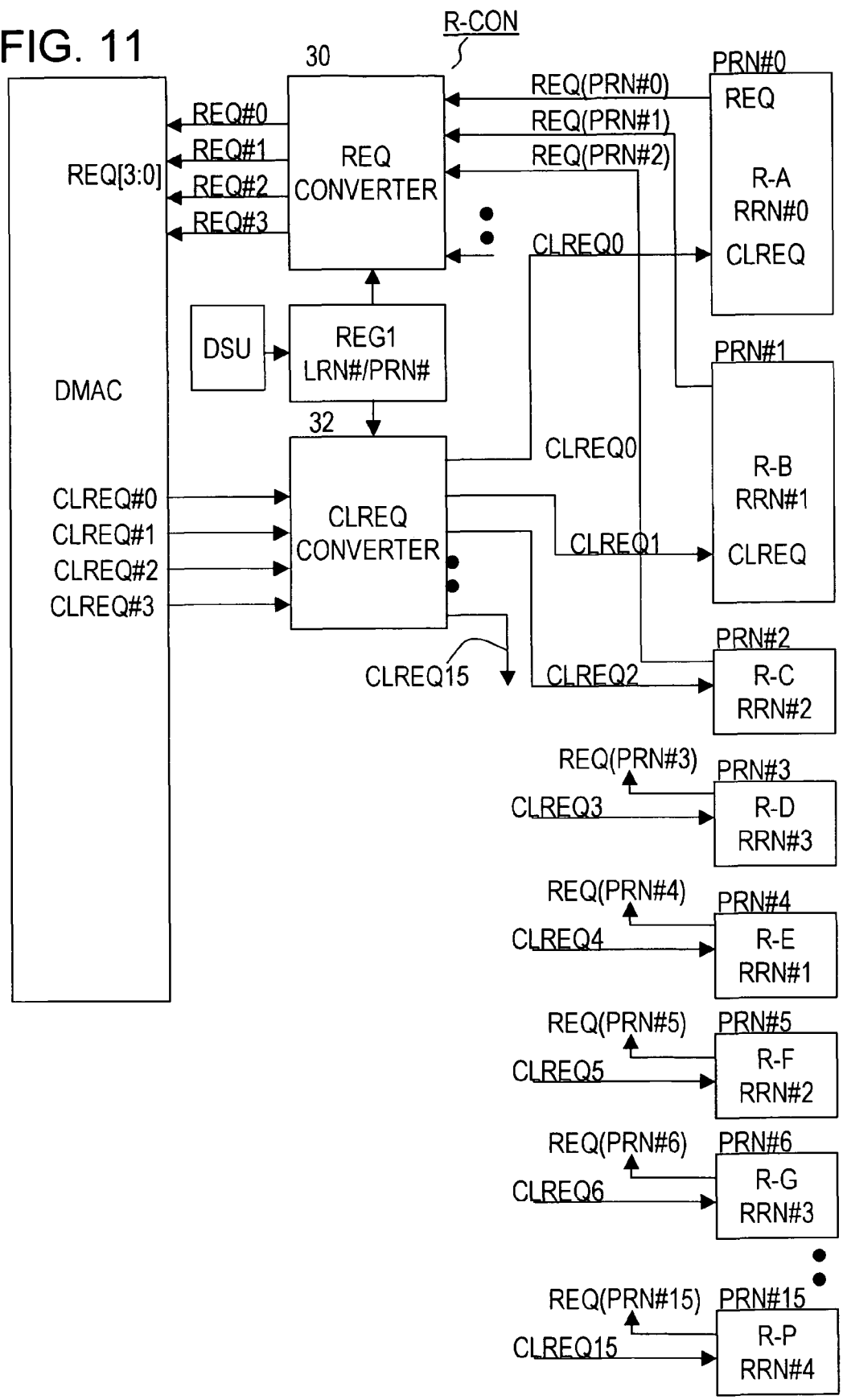
FIG. 11 shows the configuration of a modified example of the resource conversion unit R-CON in the embodiment.

FIG. 11 shows the configuration of a modified example of the resource conversion unit R-CON in this embodiment. In this example, the DMA controller DMAC outputs four clear request signals corresponding to the logical resource numbers. Hence there is no output of a logical resource number. In the case of such a DMAC, the configuration of the resource conversion unit R-CON is simplified compared with the example of FIG. 6. That is, in addition to the request conversion portion 30, only a clear request conversion portion 32 is provided, with no need for a resource number conversion portion (34 see FIG. 6). And, the clear request conversion portion 32 references the first correspondence table REG1 to convert the four clear request signals CLREQ#0 to #3 into clear request signals CLREQ0, 1, 4, 5 for the resources used.

Figure 12:
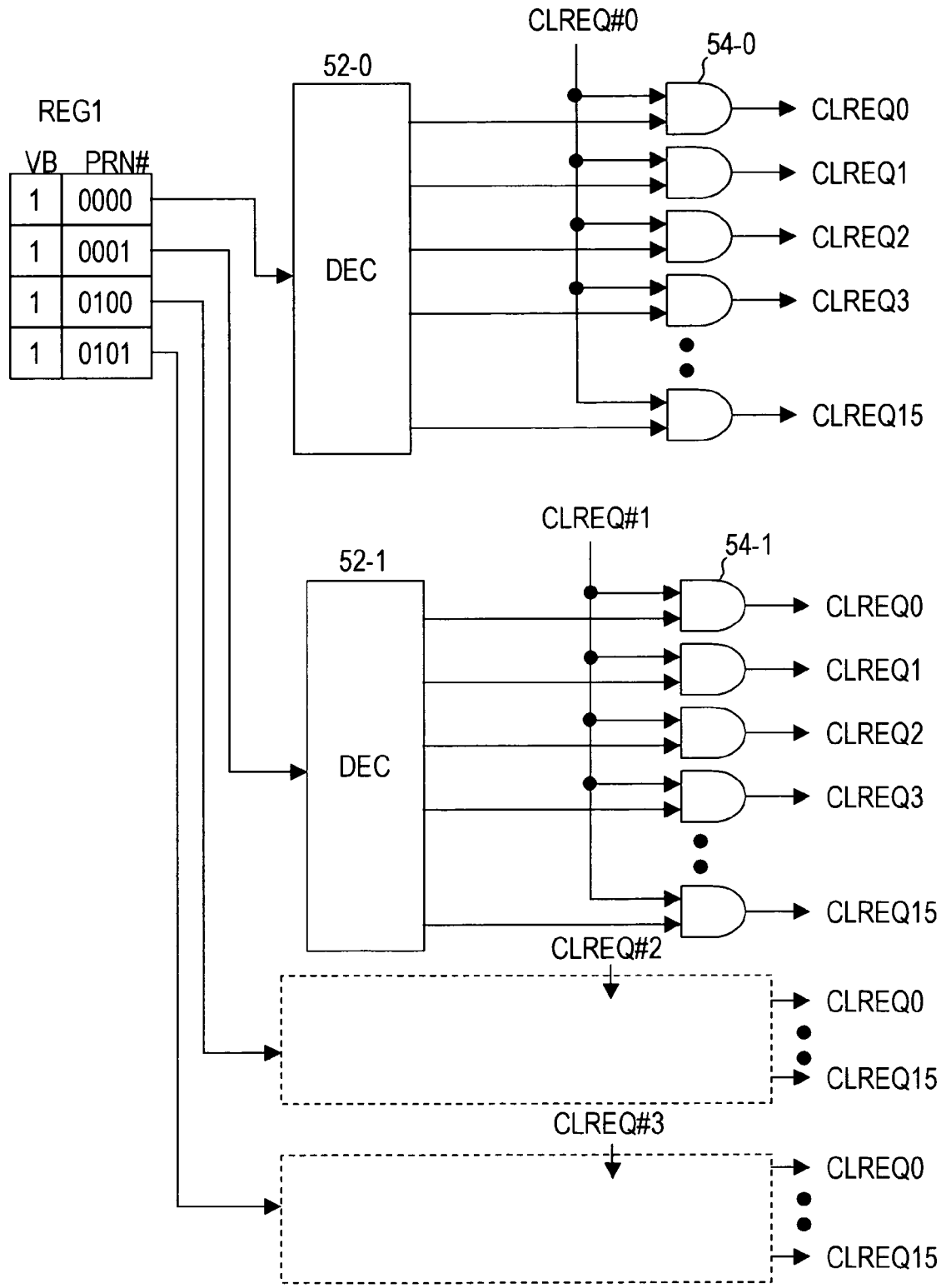
FIG. 12 shows the configuration of the clear request conversion portion 32 in the modified example of FIG. 11; and, FIG. 13 shows the configuration of another modified example of the resource conversion unit R-CON of the embodiment.

FIG. 12 shows the configuration of the clear request conversion portion 32 in the modified example of FIG. 11. The clear request conversion portion 32 comprises four units, corresponding to four logical resource numbers. Each unit has a decoder 52-0 through 52-3 which decodes physical resource numbers PRN# stored in the first correspondence table REG1, and an AND gate group 54-0 through 54-3 which converts clear request signals CLREQ#0 through #3 supplied by the DMAC into one of the clear request signals CLREQ0 through CLREQ15 for a resource in use, according to the decoder output.

By means of DMA control operation in the evaluation microcomputer of FIG. 11, a request signal asserted by a resource is converted into a request signal for the DMAC by the request conversion portion 30, and is supplied to the DMAC. In response, the DMAC executes DMA control, and on completion of DMA control, asserts a corresponding clear request signal CLREQ#0-CLREQ#3. The asserted clear request signal CLREQ#0-CLREQ#3 is converted into a clear request signal for the corresponding resource by the clear request conversion portion 32, and is supplied to the resource. Upon being supplied with the clear request signal, the resource removes assertion of its own request signal.

Figure 13:
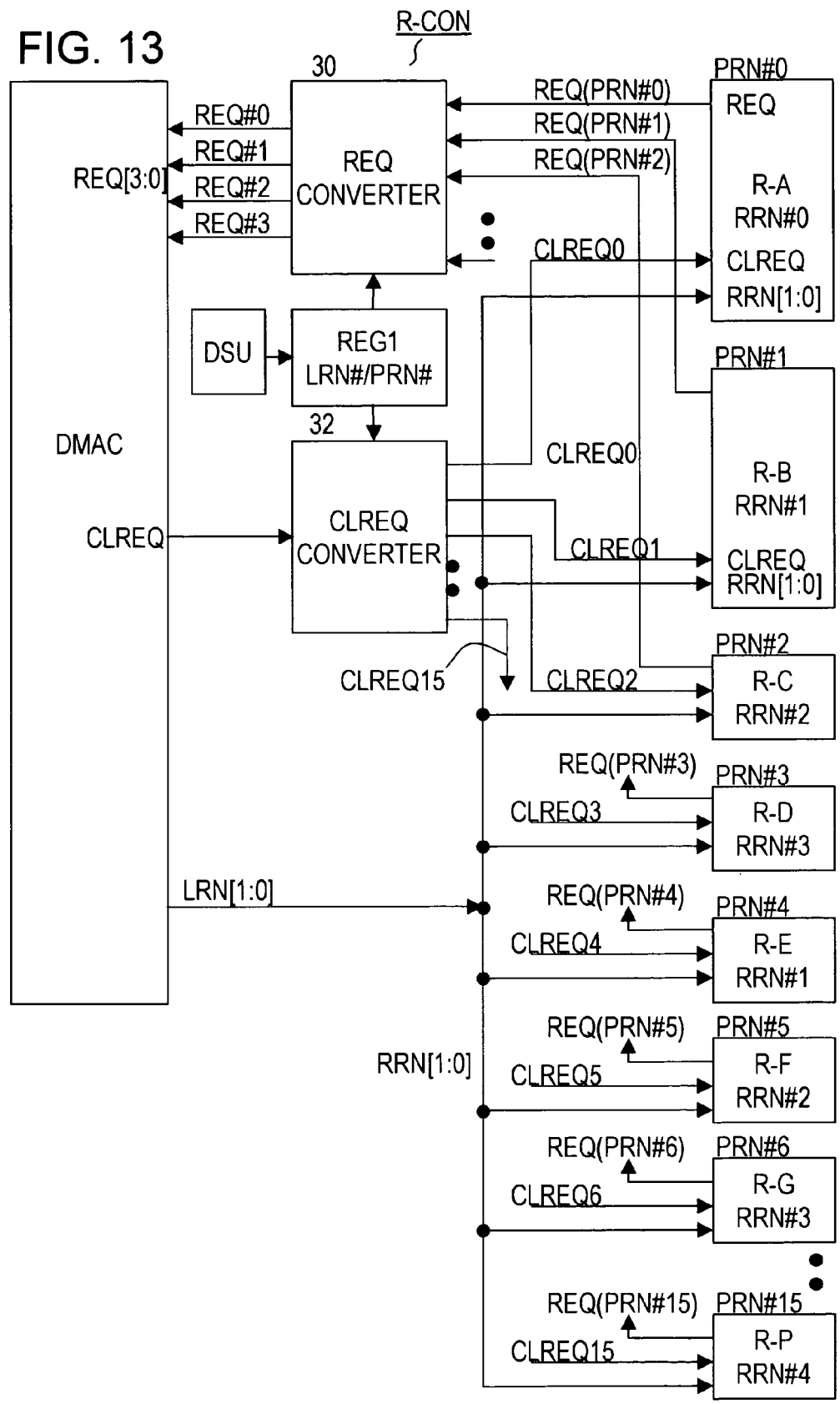

FIG. 13 shows the configuration of another modified example of the resource conversion unit R-CON of this embodiment. In this modified example, a resource number conversion portion 34 is not provided in the resource conversion unit R-CON of FIG. 6. Otherwise, the configuration is the same as in FIG. 6. Hence in the modified example of FIG. 13, logical resource numbers LRN[1:0] generated by the DMAC are supplied to all resources as real resource numbers of resources, without performing conversion. However, because there is repetition of the real resource numbers of resources, the resource subject to the clear request is identified by the clear request signals CLREQ0 to 15 converted by the clear request conversion portion 32. As is seen from the above explanation, in this modified example, resources which are used simultaneously must be combinations of the real resource numbers #0, #1, #2, #3. An evaluation computer having the resource conversion unit of this modified example can be utilized only in cases in which such limitations on usable resources are acceptable.

As explained above, by means of this embodiment, numerous previously developed resources are installed in a microcomputer for evaluation, so that the resources to be installed in a newly developed microcomputer can be arbitrarily selected and combined from previously developed resources. Moreover, even if there is repetition of the real resource numbers of the developed resources, the resource numbers are converted by a resource conversion unit, so that appropriate DMA control is possible.

What is claimed is:

1. A microcomputer, comprising:
a CPU;
a memory connected to the CPU via a CPU bus;
a direct memory access controller, connected to the CPU via the CPU bus, which controls access to the memory without passing through the CPU;
a plurality of peripheral resources, each assigned a real resource number, configured to transmit an access request to the direct memory access controller to perform data transfer with the memory, and configured to perform a prescribed function in response to a control signal from the direct access memory controller together with the assigned real resource number; and
a resource conversion unit, provided between the direct memory access controller and the plurality of peripheral resources, and including a real to logical correspondence table which associates the real resource numbers of the peripheral resources with logical resource numbers of the direct memory access controller,
wherein the plural peripheral resources are assigned a repeated given real resource number,
wherein the real to logical correspondence table is rewritable, and
wherein the resource conversion unit, based on the real to logical correspondence table, converts the logical resource number data supplied by the direct memory access controller into real resource number data of the portion of peripheral resources, and the converted real resource number data is supplied to the peripheral resources.

2. The microcomputer according to claim 1, wherein unique physical resource numbers are assigned to each of the plurality of peripheral resources, and the logical resource numbers are associated with the physical resource numbers of the portion of peripheral resources in the real to logical correspondence table.

3. The microcomputer according to claim 1, wherein the resource conversion unit has a request conversion portion which, based on the real to logical correspondence table, converts a first access request signal supplied by the portion of peripheral resources into a second access request signal corresponding to the logical resource number of the direct memory access controller, and wherein the converted second access request signal is supplied to the direct memory access controller.

4. The microcomputer according to claim 1, wherein the resource conversion unit has a clear request conversion portion which, based on the real to logical correspondence table, converts a first clear request signal to cancel an access request, supplied by the direct memory access controller, into a second clear request signal to the single corresponding peripheral resource among the portion of peripheral resources, and wherein the converted second clear request signal is supplied to the single corresponding peripheral resource.

5. The microcomputer according to claim 1, wherein the resource conversion unit has a clear request conversion portion which, based on the real to logical correspondence table, converts a first clear request signal, corresponding to the logical resource number and supplied by the direct memory access controller, to cancel the access request into a second clear request signal to a single corresponding peripheral resource among the portion of peripheral resources, and wherein the converted second clear request signal is supplied to the single corresonding peripheral resource.

6. The microcomputer according to claim 1, further having a debug support unit which is accessible by an external device, and wherein the debug support unit overwrites correspondences in the real to logical correspondence table in response to control by the external device.

7. The microcomputer according to claim 1, further having a debug support unit which is accessible by an external device, and wherein the debug support unit, in response to control by the external device, overwrites correspondences in the real to logical correspondence table.

8. A microcomputer, comprising:
a CPU;
a memory connected to the CPU via a CPU bus;
a direct memory access controller, connected to the CPU via the CPU bus, which controls access to the memory without passing through the CPU;
a plurality of peripheral resources, each being assigned a real resource number, configured to transmit an access request signal to the direct memory access controller to perform data transfer with the memory, and configured to cancel such access request signal in response to receiving a clear request signal supplied by the direct memory access controller and the assigned real resource number; and
a resource conversion unit, provided between the direct memory access controller and the plurality of peripheral resources, and including a first correspondence table that associates a portion of the peripheral resources among the plurality of peripheral resources with logical resource numbers of the direct memory access controller, the resource conversion unit to perform conversion of the access request signal and clear request signal between the direct memory access controller and the plurality of peripheral resources, based on the first correspondence table;
wherein the first correspondence table is rewritable by an external device,
wherein the plural peripheral resources are assigned a repeated given real resource number,
wherein the resource conversion unit includes a second correspondence table configured to indicate correspondences between real resource numbers of the portion of peripheral resources and the logical resource numbers, the second correspondence table is rewritable, and
wherein the resource conversion unit includes a resource number conversion portion which, based on the second correspondence table, converts logical resource number data supplied by the direct memory access controller into real resource number data of the portion of peripheral resources, and supplies the converted real resource number data to the portion of peripheral resources.

9. The microcomputer according to claim 8, wherein:
the resource conversion unit includes a request conversion portion which, based on the first correspondence table, converts a first access request signal supplied by the portion of peripheral resources into a second access request signal corresponding to the logical resource number of the direct memory access controller, and supplies the converted second access request signal to the direct memory access controller; and
the resource conversion unit includes a clear request conversion portion which, based on the first correspondence table, converts a first clear request signal to cancel an access request, supplied by the direct memory access controller, into a second clear request signal to a corresponding single peripheral resource among the portion of peripheral resources, and supplies the converted second clear request signal to the single corresponding peripheral resource.

10. A microcomputer, comprising:
a CPU;
a memory connected to the CPU via a CPU bus;
a direct memory access controller, connected to the CPU via the CPU bus, which controls access to the memory;
a plurality of peripheral resources, each including a repeated real resource number, configured to transmit an access request to the direct memory access controller to perform data transfer with the memory, and configured to perform a prescribed function in response to a control signal from the direct access memory controller together with the assigned real resource number; and
a resource conversion unit, provided between the direct memory access controller and the plurality of peripheral resources, and including a first correspondence table that associates the real resource numbers of the peripheral resources with logical resource numbers of the direct memory access controller,
wherein the resource conversion unit converts the logical resource number generated by the direct memory access controller into the real resource number, based on the first correspondence table.

11. A microcomputer, comprising:
a CPU;
a memory connected to the CPU via a CPU bus;
a direct memory access controller, connected to the CPU via the CPU bus, configured to control access to the memory;
a plurality of peripheral resources, each including a repeated real resource number and being configured to transmit an access request signal to the direct memory access controller in order to perform data transfer with the memory and to perform a prescribed function in response to a control signal from the direct access memory controller together with the assigned real resource number; and a resource conversion unit, provided between the direct memory access controller and the plurality of peripheral resources, including a first correspondence table that associates the real resource numbers of the peripheral resources with logical resource numbers of the direct memory access controller, the resource conversion unit configured to convert the logical resource number generated by the direct memory access controller into the real resource number.

12. The microcomputer according to claim 1, wherein the direct memory access controller includes four channels and two-bit logical resource numbers are provided in the direct memory access controller corresponding to these four channels.

* * * * *

UNITED STATES PATENT AND TRADEMARK OFFICE
CERTIFICATE OF CORRECTION

PATENT NO. : 8,230,133 B2  
APPLICATION NO. : 11/036332  
DATED : July 24, 2012  
INVENTOR(S) : Minoru Usui Page 1 of 1

It is certified that error appears in the above-identified patent and that said Letters Patent is hereby corrected as shown below:

Column 11, Line 21, In Claim 4, delete "the" and insert -- a --, therefor.
Column 11, Line 35, In Claim 5, delete "coresonding" and insert -- corresponding --, therefor.
Column 14, Line 7, In Claim 12, delete "are" and insert -- that are --, therefor.

Signed and Sealed this
Twenty-seventh Day of November, 2012

David J. Kappos
*Director of the United States Patent and Trademark Office*